(12) United States Patent
Hoshino

(10) Patent No.: US 6,654,984 B2
(45) Date of Patent: Dec. 2, 2003

(54) WIPER BLADE WITH TWIST FEATURE

(75) Inventor: Takashi Hoshino, Isesaki (JP)

(73) Assignee: Mitsuba Corporation, Kiryu (JP)

( * ) Notice: Subject to any disclaimer, the term of this patent is extended or adjusted under 35 U.S.C. 154(b) by 234 days.

(21) Appl. No.: 09/834,613

(22) Filed: Apr. 16, 2001

(65) Prior Publication Data
US 2001/0032370 A1 Oct. 25, 2001

(30) Foreign Application Priority Data
Apr. 19, 2000 (JP) .......................................... 2000-118305

(51) Int. Cl.[7] .................................. B60S 1/38; B60S 1/32
(52) U.S. Cl. ................................ 15/250.43; 15/250.451
(58) Field of Search .......................... 15/250.33, 250.43, 15/250.44, 250.451, 250.361, 250.46, 250.48

(56) References Cited

U.S. PATENT DOCUMENTS

| | | | | |
|---|---|---|---|---|
| 2,942,288 A | * | 6/1960 | Zaiger ...................... | 15/250.33 |
| 2,985,904 A | * | 5/1961 | Hart ........................ | 15/250.451 |
| 3,037,233 A | * | 6/1962 | Peras et al. ............. | 15/250.201 |
| 3,044,095 A | * | 7/1962 | Deibel et al. ............ | 15/250.43 |
| 3,048,873 A | * | 8/1962 | Garvey ..................... | 15/250.43 |
| 4,063,328 A | * | 12/1977 | Arman ...................... | 15/250.43 |
| 5,325,563 A | * | 7/1994 | Cayan ....................... | 15/250.46 |

* cited by examiner

Primary Examiner—Gary K. Graham
(74) Attorney, Agent, or Firm—Oliff & Berridge, PLC (57) ABSTRACT

The invention relates to a wiper blade that secures a proper error angle, wherein the wiper blade is comprised of a rubber blade and a resilient member composed of a plate spring to which a twisting feature is applied. A posture-correcting portion applies a twisting feature to the resilient member so that the full length of the resilient member and rubber blade can be curved in a spiral direction. By twisting, the resilient member approaches its natural state, and both the tip and base end portions of the rubber blade's lip portion in the lengthwise direction are adjusted in directions opposed to each other, thereby correcting the posture thereof.

22 Claims, 8 Drawing Sheets

Driver's Seat Side      Passenger's Seat Side

Positive Error Angle

Fig. 5 (B)

Positive Error Angle

Fig. 5 (C)

Negative Error Angle

WIPER BLADE WITH TWIST FEATURE

BACKGROUND OF THE INVENTION

1. Field of Invention

The invention relates to a wiper blade for a wiper apparatus incorporated in automobiles and/or vessels.

2. Description of Related Art

Generally, this type of wiper blade is attached to the tip end portion of a wiper arm via a connection member, and is resiliently brought into contact with a window surface on the basis of a pressing force of a resilient pressing mechanism disposed at the wiper arm or wiper blade. As the wiper blade reciprocates, reverses its moving direction or swings in this state, the window surface is wiped off. In such a type of wiper blade, the center part of the wiper blade in its longitudinal direction is connected to the connection member of the wiper arm, the wiper blade is pressed toward the window surface side via the connection member. Therefore, the pressing state of the wiper blade onto the window surface at the base part, intermediate part and tip end part in the longitudinal direction thereof in the process of wiping movement is made roughly the same if the window surface is flat. Accordingly, the error angle of a lip portion of the wiper blade, which becomes the contacting part of the wiper blade with the window surface, never changes greatly even at the above-described base part, intermediate part and tip end part. As a result, satisfactory wiping operations can be achieved.

The error angle is an angle that is formed by the centerline of the wiper blade and the normal line of the window surface at the portion of the window surface with which the lip portion is brought into contact. The error angle is established by the pressing direction of the lip portion to the window surface and the above-described normal line. The established error angle is set by expressing in which direction the wiper blade lies with respect to the normal line, in terms of positive or negative figures showing the corresponding direction. The wiping operations of the wiper blade will be made more favorable as a difference in the error angles becomes smaller and smaller at respective parts in the longitudinal direction of the wiper blade. In addition, it is favorable that the error angle is set so that it can be made into either one of the positive or negative figures at the respective parts of the wiper blade in the longitudinal direction, that is, so that the lying direction thereof is made into the same.

On the other hand, there are cases where the window surfaces are curved, wherein generally, the curvature ratio becomes larger and larger toward both right and left end parts, in comparison with the central portion. Both the end parts are curved so as to be erected further than the central portion. In the case of wiping off such a curved window surface, the pressing states of the wiper blade onto the window surface at the respective parts, such as the base part, intermediate part and tip end parts, differ from each other due to the curvature and erecting state to which the wiper blade is subjected in the process of the wiping movement. Therefore, the error angle becomes different at the respective parts. Moreover, where the wiper blade presses the window surface having a curvature in the vertical direction and the right and left directions so as to cross a ridge, i.e., a much more curved part, in an inclined state, the pressing direction of the wiper blade onto the window surface may differ at both end parts in the longitudinal direction thereof. If so, the error angles thereof become reverse figures of each other in terms of positive and negative, and the lying directions of the lip portion with respect to the supporting part may be made inverse (opposed to each other) at both end parts.

SUMMARY OF THE INVENTION

Figure 2:
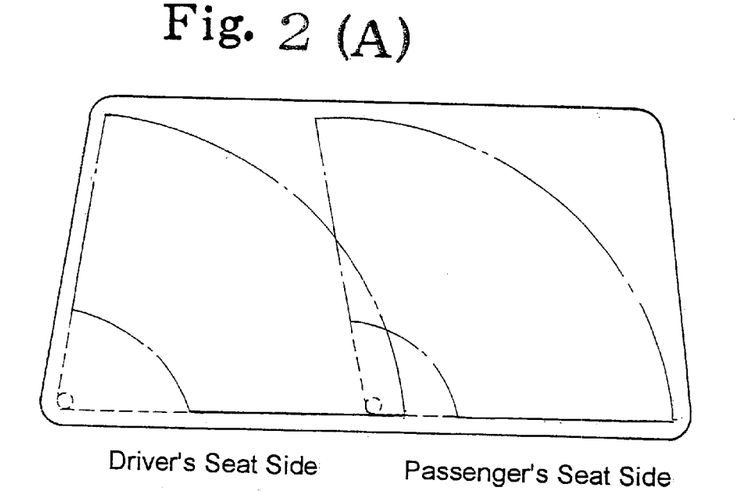
FIG. 2(A) is a pattern view showing a wiping range by a wiper blade.
FIG. 2(B) is a plan view showing a twisting feature of a resilient member.
FIG. 2(C) is a front elevational view showing a twisting feature of a resilient member.
Figure 7:
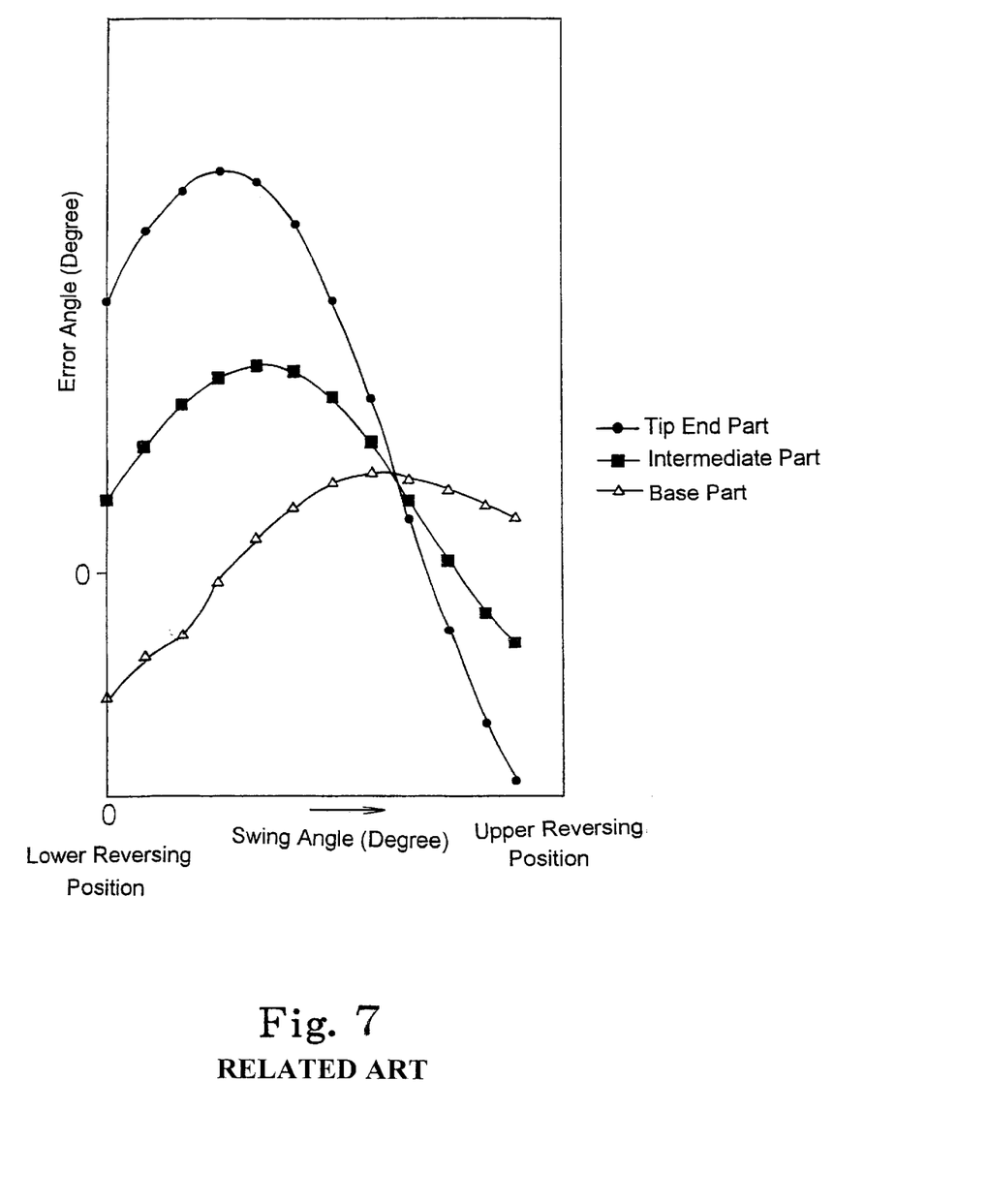
FIG. 7 is a graph showing changes in the error angle in the process of a related art wiper blade.

A wiper apparatus as shown in FIG. 2(A) is structured so that it has swinging axis parts of the wiper arms supported at one side part and the central part of the curved window surface described above. A pair of wiper blades, one for the driver's seat and the other for the passenger's seat, are attached to the swinging axis parts. In such a wiper apparatus, the swinging axis part of the wiper blade for the driver's seat is located at one side part of the window surface. In this case, the wiper blade of the wiper arm that is attached at the swinging axis part for the driver's seat may be disposed approximately at the central part of the window surface, wherein there is no large difference in respective error angles since the curvature of the window surface is small at the lower reversing position of the wiper blade. However, as the wiper blade comes to the end part side of the window surface, approaching the upper reversing position, the error angle at both end parts in the longitudinal direction becomes smaller in comparison with that at the intermediate part. To the contrary, generally, the wiper blade of the wiper arm attached at the swinging axis part of a wiper apparatus for the passenger's seat, which is positioned at the central part of the window surface, is disposed near the end part of the central part of the window surface. Therefore, the error angles at both of the tip end part and the base part at the upper and lower reversing positions of the wiper blade, as in the graph shown in FIG. 7, become reverse (positive and negative) figures centering around the intermediate part. As a result, the difference in the error angle at the respective parts tends to increase.

Thus, in the case where the error angles at both end parts in the longitudinal direction becomes reverse (positive and negative) figures centering around the central part, although the wiper blade is such that the error angles at the respective parts may change due to the relationship between the corresponding wiper blade and the profile (curvature) of the window surface, a problem occurs in that the wiping performance cannot be sufficiently displayed. Further, in the case where the wiper blade is maintained at the lower reversing position when the wiper apparatus is not used, the difference in the error angle at the respective parts is large, as described above, at the wiper blade for the passenger's seat, resulting in the error angles at both end parts in the longitudinal direction becoming reverse (positive and negative) figures centering around the intermediate part. When the wiper apparatus is not used, the wiper blade is pressed to the window surface in a resiliently pressed state for a long time subjecting the blade rubber to abnormal deformation, wherein abnormal noise is generated in wiping operations and the blade rubber may be liable to excessive wear. The invention aims to solve the above-described problems.

The invention was developed to solve the problems and other shortcomings in terms of the above-described situations. It is therefore an object of the invention to provide a wiper blade, attached to the tip end part of a wiper arm via a connection part, which reciprocates, inverses its moving direction, or swings in a state where the above-mentioned wiper blade is resiliently brought into contact with a window surface by a resilient pressing mechanism disposed at the above-mentioned wiper arm. The wiper blade is constructed so as to wipe off the above-mentioned window surface. The above-mentioned wiper blade includes a lip portion that protrudes at least toward the window surface and is able to change the posture thereof to a risen posture erect from the above-mentioned window surface and to a lain posture turned down on the above-mentioned window surface. The wiper blade further includes a resilient member that presses the above-mentioned lip portion so as to be brought into close contact with the above-mentioned window surface. The resilient member includes a posture-correcting portion, which is provided with a twisting feature to correct both end parts of the above-mentioned lip portion in its lengthwise direction with respect to each other by returning the above-mentioned resilient member to its natural state. Thereby, the lip portion of the wiper blade is corrected with respect to its lengthwise posture, and the wiper blade can be provided with an adequate error angle over the full length of the blade.

In such a wiper blade, the above-mentioned resilient member is a long plate spring, or a pair of parallel plate springs, and the above-mentioned posture-correcting portion is formed at both the tip end portions of the above-mentioned plate springs.

Further, in such a wiper blade, the above-mentioned resilient member is a long plate spring, and the above-mentioned posture-correcting portion is formed over the full length in the lengthwise direction of the above-mentioned plate spring.

Still further, in such a wiper blade, the above-mentioned resilient member is made rectilinear against a pressing force of the above-mentioned resilient member to cause the above-mentioned lip portion to be erected to a risen posture.

Yet still further, in such a wiper blade, the above-mentioned risen posture of the lip portion may be substantially perpendicular to the window surface over the full length of the wiper blade. Moreover, the lip portion may be protrudingly attached to the resilient member so that the lip portion may become substantially orthogonal to the plate surface of the resilient member.

Finally, in such a wiper blade, the resilient member may be curved further in a longitudinal direction such that the resilient member's natural state of curvature exceeds the maximum curvature of the window surface.

BRIEF DESCRIPTION OF THE DRAWINGS

FIGS. 4(A) and (B) are, respectively, a sectional view and a partial perspective view of a wiper blade;

FIGS. 5(A), (B) and (C) are, respectively, sectional views describing error angles;

DETAILED DESCRIPTION OF PREFERRED EMBODIMENTS

Next, a description is given of an embodiment of the invention with reference to the accompanying drawings FIG. 1 through FIG. 7.

Figure 1:
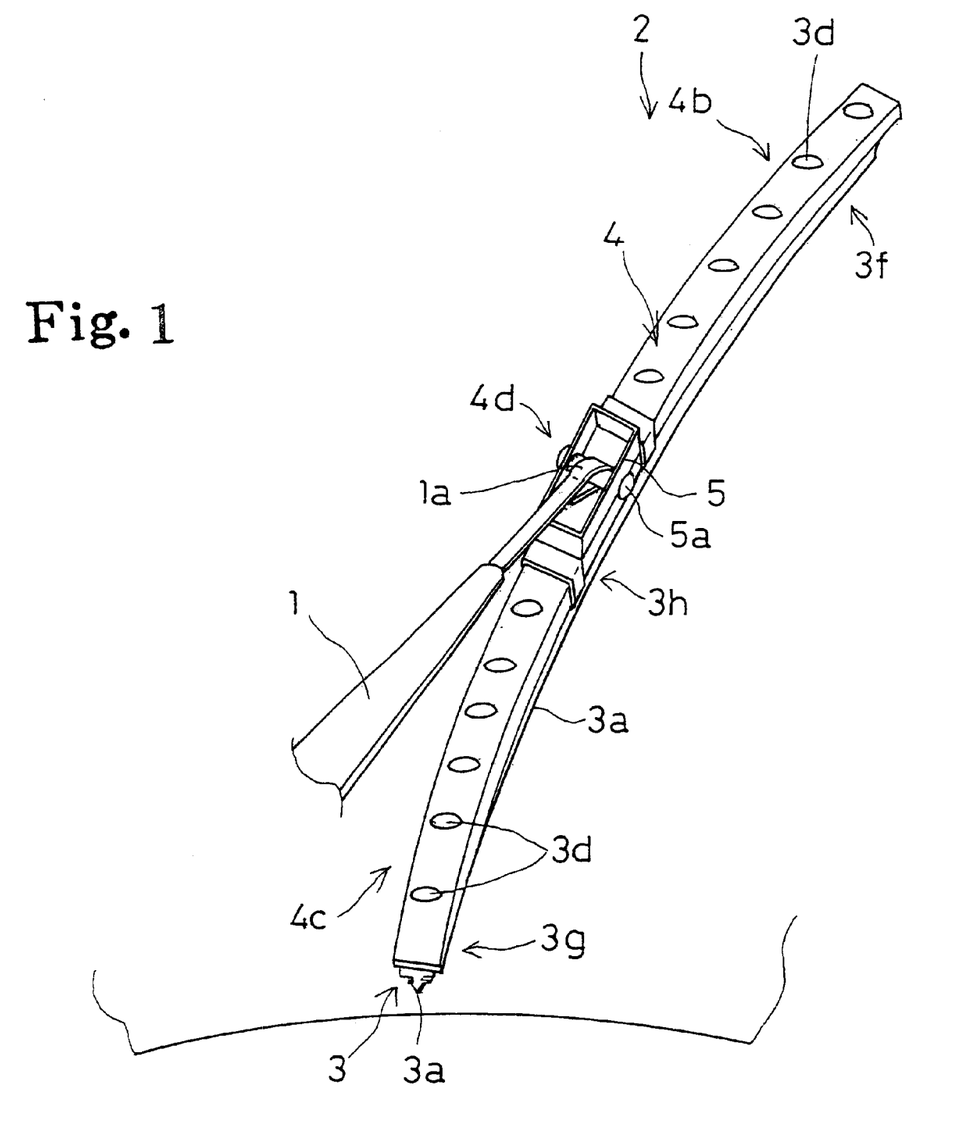
FIG. 1 is a perspective view showing a state where a wiper blade is attached to a wiper arm.

In the drawings, 1 denotes a wiper arm that constitutes a wiper apparatus. The base part of the wiper arm 1 is fixed at a pivot axis (that is a wiper axis (not shown)) that is supported at the vehicle body so as to freely rotate so that the wiper arm 1 reciprocates, reverses its movement and swings on the basis of normal and reverse rotation of the pivot axis. A wiper blade 2 is attached to the tip end of the wiper arm 1 as described below. The wiper blade 2 is set so that it is pressed toward the window surface based on a pressing mechanism (not shown) secured at the wiper arm 1.

Figure 3:
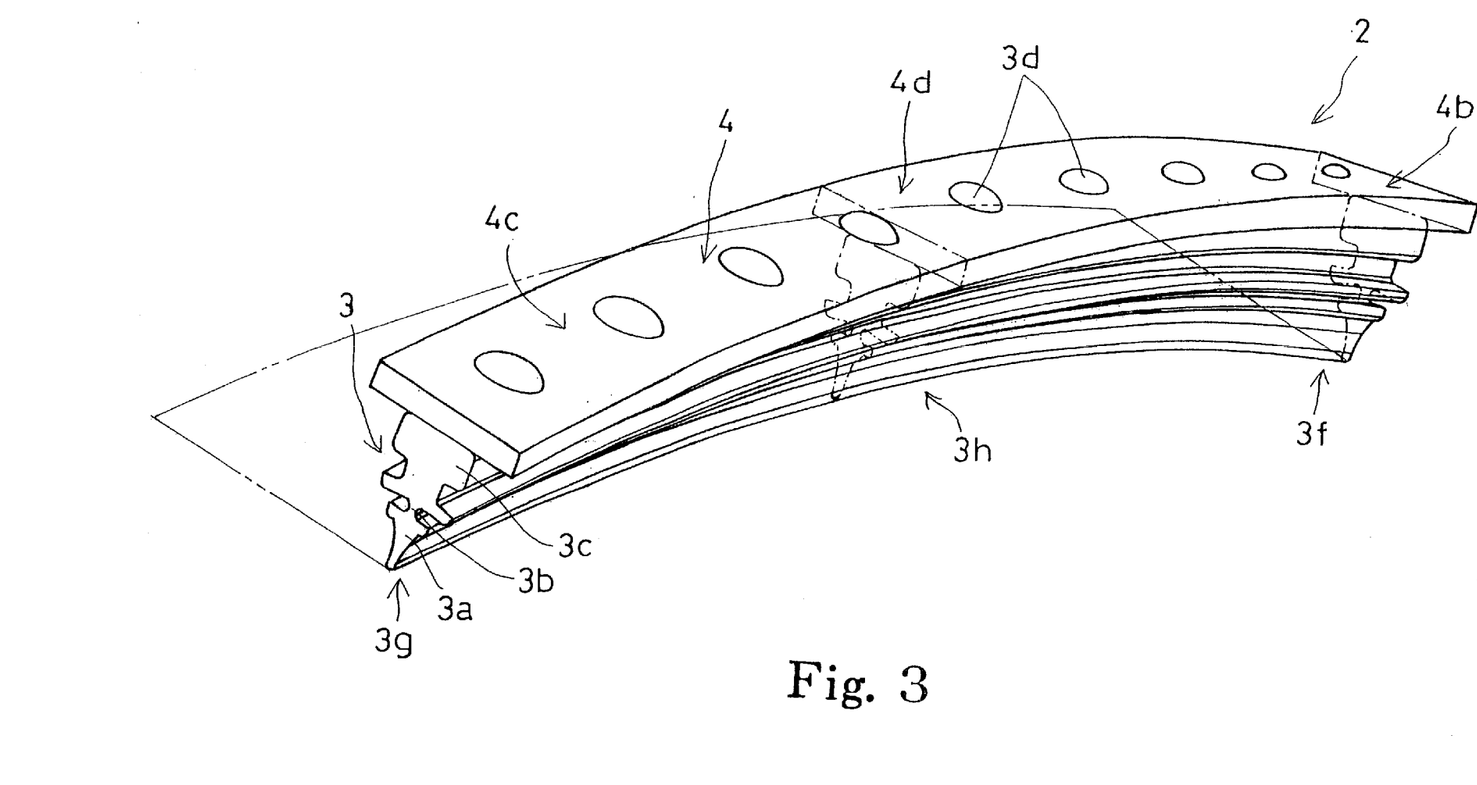
FIG. 3 is a model diagram describing a construction of a wiper blade.
Figure 4:
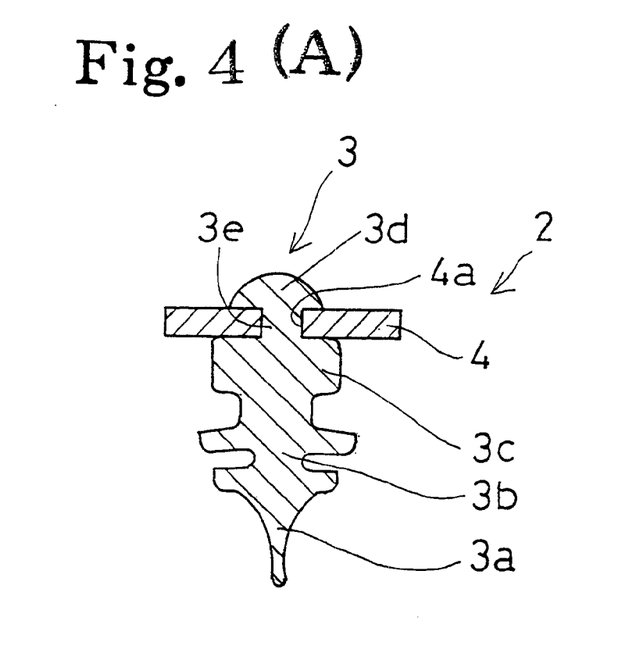

The above-mentioned wiper blade 2 is formed to be elongated, and is structured so as to include a rubber-made rubber blade 3 and a resilient member 4. The above-mentioned rubber blade 3 is formed so that its base part 3c is integrally connected to the lip portion 3a. The lower end point of the lip portion 3a is brought into contact with the window surface. The lip portion 3a, whose section is like an inverted triangle, has a neck portion 3b whose section has a slender width. The lip portion 3a is set so that it can swing and be deformed between a risen posture erect with respect to the base portion 3c (that is, the posture at which the centerline of the base part agrees with the centerline of the lip portion) and a lain posture inclined with respect to the base portion 3c due to resilient deformation of the neck portion 3b. Also, a plurality of engaging protrusions 3d, having an adequate interval therebetween, are formed so as to protrude upward from the upper end face of the base portion 3c via diameter-reduced parts 3e.

Figure 5:
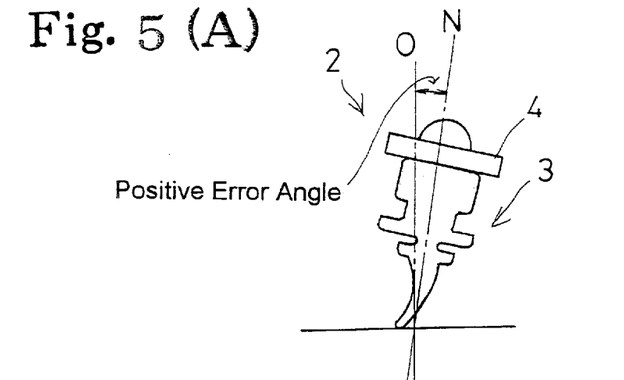

An error angle is formed between the centerline N of the wiper blade 2 and the normal line O of the window surface by the lip portion 3a being lain. However, as shown in FIG. 5, the error angle is regarded as a positive error angle in a state where the centerline N of the wiper blade 2 is displaced clockwise with respect to the normal line O of the window surface. Similarly, the error angle is regarded as a negative error angle in a state where the centerline N thereof is displaced counterclockwise with respect to the normal line O thereof.

The above-mentioned resilient member 4 is an elongated plate spring that is curved in its natural state. The resilient member 4 is provided with a plurality of attaching holes 4a opposite to the engaging protrusions 3d formed on the upper end face of the base portion 3c of the rubber blade 3. The above-mentioned plurality of engaging protrusions 3d are inserted into the corresponding attaching holes 4a by fitting the diameter-reduced parts 3e into the respective attaching holes 4a. Thus, the rubber blade 3 is set so that the engaging protrusions 3d are prevented from separating from the resilient member 4, and the resilient member 4 and rubber blade 3 are assembled together. Further, the resilient member 4 has a bending (twisting) characteristic, which is biased by an appointed angle α with respect to a line M orthogonal to the axial line L in the longitudinal direction, over the full length of the resilient member 4 in the longitudinal direction as shown in FIG. 2(B). In this state, the resilient member 4 is structured to be spirally twisted with reference to the axial line L.

In addition, as shown in FIG. 2(C), the resilient member 4 is formed to be further curved in the longitudinal direction than the maximum curvature of the wiping area on the window surface in a natural state. Upon receiving a pressing force, the resilient member 4 may be widened (deflected) so as to adapt to the curvature of the window surface, whereby the respective parts of the wiper blade 2 in its longitudinal direction can fully and evenly be brought into contact with the window surface.

A rubber blade 3 is attached to the resilient member 4 thus constructed, wherein the rubber blade 3 is assembled as described above and is attached so that the lip portion 3*a* becomes approximately orthogonal to the plate surface of the resilient member 4 at respective points in the longitudinal direction thereof. Thereby, where the resilient member 4, residing in a natural state, is observed based upon the axial line L, the tip end portion 3*f* of the rubber blade 3 in the longitudinal direction thereof and the lip portion 3*a* at the base end part 3*g* are set so as to be twisted from each other.

Although the direction of the above-mentioned twisting feature is given so as to correspond to the set position of the wiper blade 2 with respect to the window surface on the driver's seat side of the vehicle in the present embodiment, the description also applies to a resilient member 4 disposed at the wiper blade 2 at the passenger's seat side of a vehicle, wherein the wiper blade 2 is secured at the central part of the window surface having a large curvature, as described above.

In a prior art wiper apparatus, the error angle at the lower reversing position of the blade rubber 3 at the passenger's seat takes a negative figure (lain posture in the counterclockwise direction) at the base end part 3*g* of the blade rubber 3 while it takes a positive figure (lain posture in the clockwise direction) at the tip end part 3*f*. Further, it takes a positive figure at the intermediate part 3*h* in the longitudinal direction therebetween. Therefore, as a twisting feature is given to the resilient member 4, a counter-twisting feature is applied, which causes the tip end part 3*f* of the rubber blade 3 to be corrected with respect to its posture in the counterclockwise direction. Because the resilient member 4 is curved in its natural state and deflected at the side approaching corresponding to the curvature of the window surface in the vicinity of the lower reversing position, the lip portion 3*a* is set so that it is inclined toward the counterclockwise direction.

On the other hand, at the base end portion 4*c* of the resilient member 4, a counter-twisting feature is also applied, which causes the base end portion 3*g* of the rubber blade 3 to be corrected with respect to its posture in the clockwise direction. Because the resilient member 4 is curved in its natural state and deflected at the side corresponding to the curvature of the window surface in the vicinity of the upper inverting position, the lip portion 3*a* is set so that it is inclined toward the clockwise direction.

In addition, the rubber blade lip portion 3*a* is set so that it takes an erect, risen posture, i.e., perpendicular with respect to the window surface, where the error angle becomes roughly zero with respect to the window surface over the full length of the wiper blade 2 when the resilient member 4 becomes rectilinear against the resiliency of the corresponding resilient member 4 itself.

A wiper blade 2 structured by assembling a rubber blade 3 in a resilient member 4 to which a twisting feature is applied is provided with a metal fitting 5 at the intermediate part 3*h* in the longitudinal direction, and a U-shaped folded-over hook part 1*a*, which is formed at the tip end of the wiper arm 1, is rotatably engaged with a rotating pin 5*a* of the attaching metal fitting 5, whereby the wiper blade 2 is set so as to be swingably coupled to the wiper arm 1. The wiper blade 2 receives a pressing force of a resilient pressing mechanism (not shown) of the wiper arm 1 via the central part (the connection part with the wiper arm 1) of the wiper blade 2 in the longitudinal direction, and is resiliently brought into close contact with the window surface where it can receive the pressing force given by the resilient member 4. A wiping operation is carried out in this state.

Next, in the process of a wiping operation of a window surface by a rubber blade 3, where the rubber blade 3 enters a state of striding over the ridge in an inclined state along the curvature of the window surface, the resilient member 4 is deformed by the tip end portion 3*f* of the rubber blade 3 and the base end portion 3*f* receiving a change in the curvature of the window surface, and the rubber blade base portion 3*c* is curved. A twisting feature operates on the lip portion 3*a*, and the lip portion 3*a* is set so that the posture thereof is corrected so as to be lain in an appointed direction where both end parts 3*f*, 3*g* of the lip portion 3*a* become opposite to each other. Therefore, the posture of the lip portion 3*a* at the tip end portion 3*f* and the base end portion 3*g* approaches an erect, risen posture, and the error angles at the respective tip end 3*f* and base end 3*g* portions become small.

Figure 6:
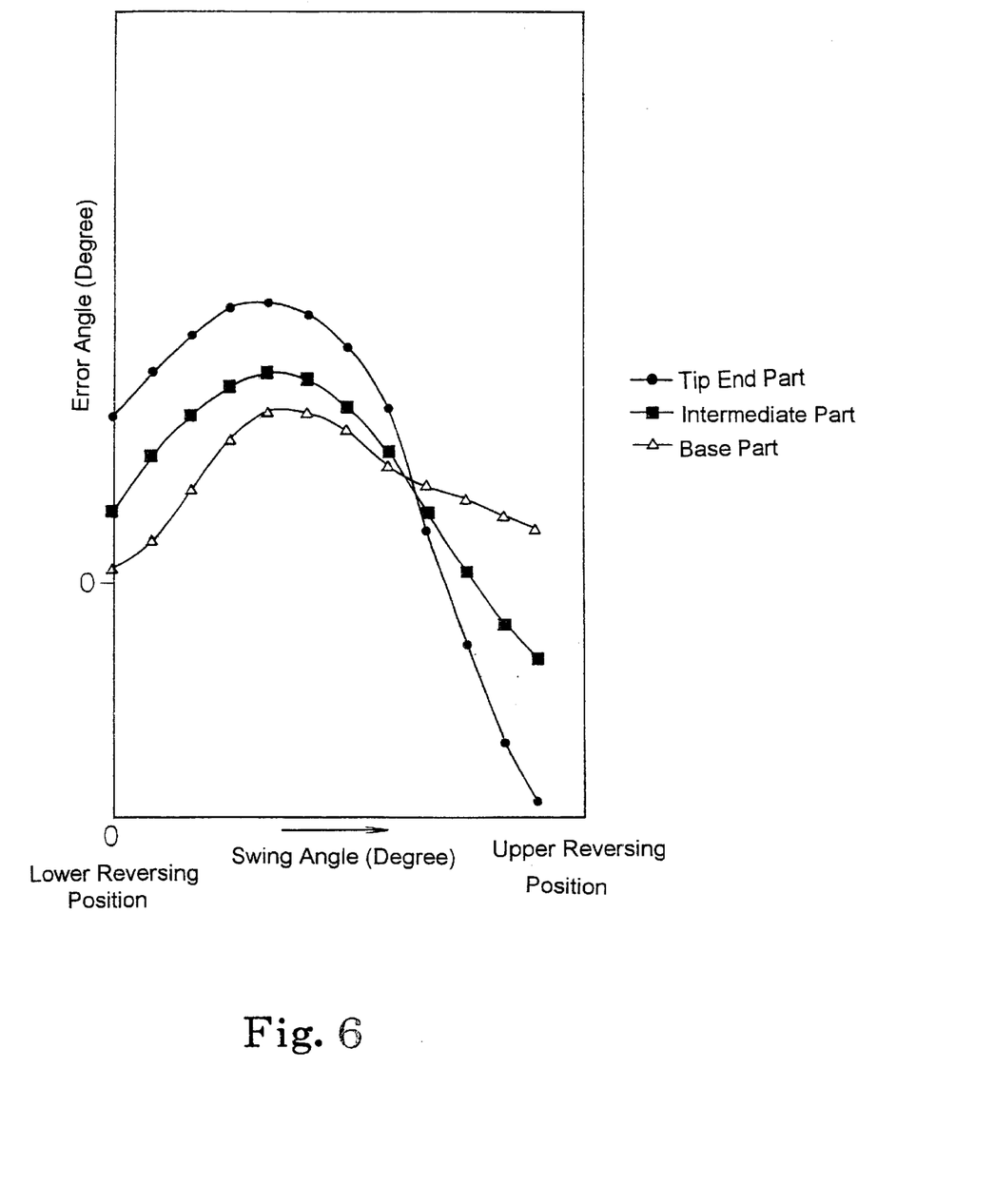
FIG. 6 is a graph showing changes in the error angles in the wiping process of the wiper blade.

In this connection, with respect to a wiper apparatus at the passenger's seat, in which a wiper blade 2 according to the embodiment is employed, changes in the error angles at the tip end portion 3*f*, base end portion 3*g* and intermediate portion 3*h* of the rubber blade 3 are shown in FIG. 6. Thereby, at the lower reversing position of the wiper blade 2, all the error angles at the respective portions such as the tip end portion 3*f*, intermediate portion 3*h* and base end portion 3*g* become positive. At the same time, differences in the error angles at the respective portions can be reduced.

Although a twisting feature, in the exemplary described embodiment, is applied in full length of the resilient member 4, the twisting feature is also applied so that the twisting direction at the tip end portion 4*b* becomes opposite to that at the base end portion 4*c* centering around the intermediate part 4*d*. That is, twisting is applied to the tip end portion 4*b* of the resilient member 4 in the counterclockwise direction, so that the error angle becomes smaller and smaller toward the intermediate portion 4*d* side, in a range from the tip end portion 4*b* of the resilient member 4 to the intermediate portion 4*d* thereof. Likewise, twisting is applied to the base end portion 4*c* of the resilient member 4 in the clockwise direction, so that the error angle of the resilient member 4 becomes smaller and smaller toward the intermediate portion 4*d* in a range from the base end portion 4*c* to the intermediate portion 4*d*. For this reason, the resilient member 4 is deformed in response to the relationship between the resiliency of the resilient member 4 and the curvature of the window surface, without being limited to the tip end portion 4*b*, intermediate portion 4*d* and base end portion 4*c* as described above in order to correct the posture of the rubber blade lip portion 3*a*.

In the exemplary embodiment of the invention, structured as described above, the wiper arm 1 reciprocates, reverses its moving direction and swings by clockwise and counterclockwise rotations of the pivot axis on the basis of drive of a wiper motor (not shown), whereby the wiper blade 2 is resiliently brought into contact with the window surface upon receiving a pressing force of a pressing mechanism (not shown) at the wiper arm 1 side, and a wiping operation is carried out in this state. For example, when the wiper blade 2 at the passenger's seat is positioned so as to stride over the ridge in an inclined state, the resilient member 4 is deformed (deflected) so as to follow the profile of the window surface, which both end portions 3*f*, 3*g* of the rubber blade 3 face. A twisting feature of the resilient member 4 operates on both end portions 3*f*, 3*g* of the rubber blade 3 as described above, and the lip portions 3*a* at both end portions 3*f*, 3*g* are made into a lain posture by which the lip portions 3*a* of the tip end 3*f* and the lip portion 3*a* of the base end 3*g* are, respectively, turned so as to be opposite to each other. Thus, the postures of the respective lip portions 3*a* are corrected to favorable error angles. Therefore, the error angles at the respective portions of the blade rubber lip portions 3a can be reduced, and wiping performance on the window surface can be sufficiently displayed.

Still further, in the exemplary described embodiment, at the lower reversing position of the wiper blade 2 on the passenger's seat side, that is, at the posture when the wiper is not used, all the error angles at both end portions 3f, 3g and at the intermediate portion 3h are corrected to become positive figures. As a result, even if this state is maintained for a long time, a malfunction, for example, abnormal deformation of the rubber blade 3 in the case where the error angles at both end portions become reverse (positive and negative) relative to one another, centering around the intermediate portion as in a prior art wiper blade can be solved. Accordingly durability of a wiper blade 2 is not only improved, but also wiping function with silent operation is achieved.

Thus, according to the exemplary described embodiment of the invention, a resilient member 4 secured over the full length in the longitudinal direction is structured so that a reversed twisting feature is applied to both end portions 3f, 3g of the rubber blade 3, and the postures of the lip portions 3a at the respective tip end 3f and base end 3g are corrected relative to each other so that the error angles at both end portions can be improved, even under a condition that the lip portions 3a stride over the ridge on the window surface in an inclined state. As a result, it is possible to reduce the differences in the error angle between the respective tip end 3f and base end 3g portions, and uniform wiping performance can be displayed.

The invention is not limited to the above-mentioned exemplary embodiment. As a posture-correcting portion formed by applying a twisting feature to the resilient member, it may be partially formed at, for example, only both end portions of a plate spring in the longitudinal direction thereof without applying a twisting feature to the plate spring over the full length in the longitudinal direction thereof as in the exemplary described embodiment. In such a partially formed posture-correcting embodiment, the twisting feature may be applied to appropriate points corresponding to the curvature of the window surface, making it similarly possible to improve the error angle over the full length in the longitudinal direction of the wiper blade.

In the above-described exemplary embodiment, a description was given of the case where the invention is applied to a wiper blade in a wiper apparatus having a swinging axis portion at the central portion of the window surface. However, because the wiper blade according to the invention can effectively function when the error angles of the wiper blade become reversed (positive and negative) at both end portions of the rubber blade 3 in the longitudinal direction corresponding to the curvature profile of the window surface, the invention is also applicable to a wiper blade for which the swinging axis portions are secured at the end side of the window surface, or in the case where a wiper blade for which only one swinging axis portion is disposed at the window surface.

Still further, although in the above-described exemplary embodiment a connection metal fitting 5 is secured directly at the resilient member, and a wiper blade 2 is connected to the connection metal fitting 5, such a wiper apparatus may be structured, in which a four-point pressing tournament type or a two-point pressing torsion spring type blade lever is attached to the wiper blade 2 constructed as in the above-mentioned exemplary embodiment.

Figure 8:
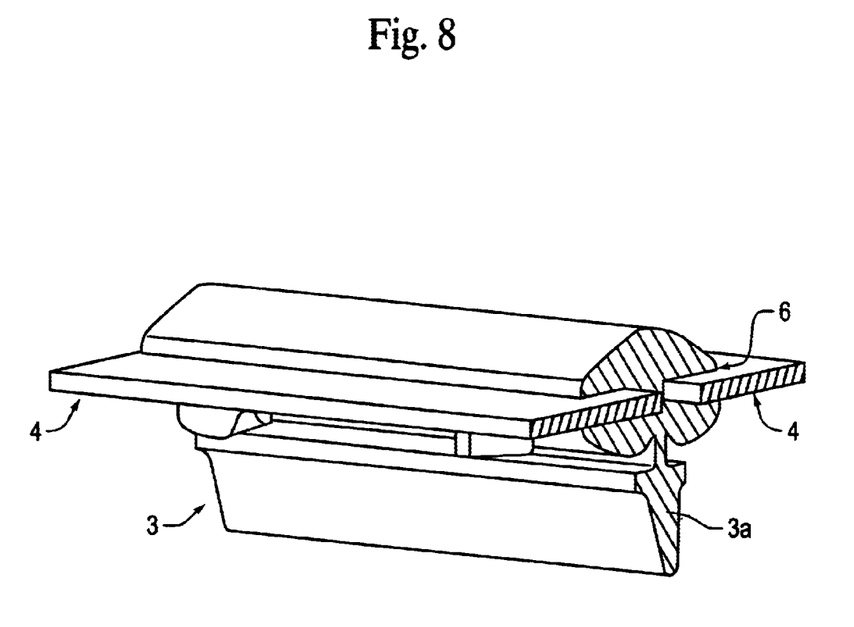
FIG. 8 is a partial perspective view of a wiper blade with a pair of parallel plate springs.

In addition, a wiper blade 2 as a resilient member 4 and rubber blade 3 integrally molded together by out-insert or adhered to each other may also be acceptable. Further, as shown in FIG. 8, the resilient member 4, in this case, a pair of plate springs to which a twisting feature is applied, may be inserted into an attaching groove 6 formed at both end portions of the blade rubber 3 in the wiping direction.

While the invention has been described in conjunction with the exemplary embodiments outlined above, it should be appreciated that many alternatives, modifications and variations will be apparent to those skilled in the art. Accordingly, the exemplary embodiments of the invention, as set forth above, are illustrative only, and not limiting. Various changes may be made without departing from the spirit and scope of the invention.

What is claimed is:

1. A wiper blade attached to a tip end portion of a wiper arm via a connection part, which wiper blade reciprocates, reverses its moving direction, or swings in a state where the wiper blade is resiliently brought into contact with a window surface having a curvature by a resilient pressing mechanism disposed at the wiper arm and is structured so as to wipe off the window surface, the wiper blade, comprising:

a lip portion having a changeable posture that protrudes at least toward the window surface, the lip portion posture changing to a risen posture erect from the window surface and to a lain posture turned down on the window surface according to the wiper blade movements; and a resilient member that presses the lip portion into close contact with the window surface, said resilient member being an elongated unitary plate spring formed from a tip end portion and to a base end portion of the wiper blade, wherein the resilient member includes a posture-correcting portion provided with a twisting feature to correct a tip end and a base end of the lip portion in a longitudinal direction to posture directions opposed to each other in accord with the returning of the resilient member to its natural state.

2. The wiper blade according to claim 1, wherein the posture-correcting portion is formed at a tip end portion and a base end portion of the plate spring.

3. The wiper blade according to claim 2, wherein the resilient member is made rectilinear by a pressing force against the window surface to cause the lip portion to be erected to a risen posture.

4. The wiper blade according to claim 3, wherein the resilient member is formed to be further curved in the longitudinal direction than a maximum curvature of the window surface in a natural state.

5. The wiper blade according to claim 2, wherein the resilient member is formed to be further curved in the longitudinal direction than a maximum curvature of the window surface in a natural state.

6. The wiper blade according to claim 1, wherein the posture-correcting portion is formed over the full length in the longitudinal direction of the plate spring.

7. The wiper blade according to claim 6, wherein the resilient member is made rectilinear by a pressing force against the window surface to cause the lip portion to be erected to a risen posture.

8. The wiper blade according to claim 6, wherein the resilient member is formed to be further curved in the longitudinal direction than a maximum curvature of the window surface in a natural state.

9. The wiper blade according to claim 1, wherein the resilient member is made rectilinear by a pressing force against the window surface to cause the lip portion to be erected to a risen posture.

10. The wiper blade according to claim 9, wherein the risen posture of the lip portion is the posture wherein the lip portion is substantially perpendicular to the window surface over the full length of the wiper blade.

11. The wiper blade according to claim 9, wherein the resilient member is formed to be further curved in the longitudinal direction than a maximum curvature of the window surface in a natural state.

12. The wiper blade according to claim 1, wherein the resilient member is formed to be further curved in the longitudinal direction than a maximum curvature of the window surface in a natural state.

13. The wiper blade according to claim 12, wherein the lip portion is protrudingly attached to the resilient member so that the lip portion becomes substantially orthogonal to a plate surface of the resilient member.

14. A wiper blade apparatus for contacting the window surface of vehicles and vessels, the apparatus comprising:

a wiper arm having a fixed end and a tip end, the fixed end rotatably affixed to the vehicle or vessel, the tip end comprising a connection part;

a wiper blade having an elongated unitary resilient member and a rubber blade fitted to the resilient member the resilient member having a tip end, an intermediate portion and a base end, and the rubber blade having a corresponding tip end, intermediate portion and base end;

the rubber blade of the wiper blade further comprising a lip portion extending in a longitudinal direction from a tip end and a base end corresponding from the tip end to the base end of the rubber blade, the lip portion having a changeable posture;

the resilient member having a natural state whose curvature is greater than a curvature of the window surface to be contacted, whereby the natural state is deflected to comply with the curvature of the window surface upon contacting the window surface;

wherein, the wiper blade is attached at an intermediate portion of the resilient member to the connection part of the wiper arm to effectuate a reciprocating wiping motion of the wiper blade and wiper arm against the window surface, whereby the posture of the lip portion relative to the window surface changes according to the motions of the wiper blade and wiper arm; and a posture-correcting portion as a part of the resilient member providing a twisting feature to the tip end and base end of the lip portion of the rubber blade such that the tip end of the lip portion adjusts the posture of the lip portion in one direction whereas the base end of the lip portion adjusts the posture of the lip portion in an opposite direction to minimize error angle differences between the tip end and base end portions when the resilient member is in a non-wiping motion or its natural state.

15. The wiper blade apparatus according to claim 14, wherein the resilient member is an elongated plate spring, and the posture-correcting portion is formed at a tip end and a base end portion of the plate spring.

16. The wiper blade apparatus according to claim 14, wherein the resilient member is an elongated plate spring, and the posture-correcting portion is formed over the full-length of the plate spring in the longitudinal direction.

17. The wiper blade apparatus according to claim 14, wherein the resilient member is made rectilinear by a pressing force against the window surface to cause the lip portion to be erected to a risen posture.

18. The wiper blade apparatus according to claim 14, wherein the posture of the lip portion is a risen posture substantially perpendicular to the window surface over the full length of the wiper blade.

19. The wiper blade according to claim 14, wherein the lip portion is protrudingly attached to the resilient member so that the lip portion becomes substantially orthogonal to a plate surface of the resilient member.

20. A wiper blade attached to a tip end portion of a wiper arm via a connection part, which wiper blade reciprocates, reverses its moving direction, or swings in a state where the wiper blade is resiliently brought into contact with a window surface having a curvature by a resilient pressing mechanism disposed at the wiper arm and is structured so as to wipe off the window surface, the wiper blade, comprising:

a lip portion having a changeable posture that protrudes at least toward the window surface, the lip portion posture changing to a risen posture erect from the window surface and to a lain posture turned down on the window surface according to the wiper blade movements; and at least one resilient member that presses the lip portion into close contact with the window surface, said resilient member being an elongated unitary plate spring formed from a tip end portion and to a base end portion of the wiper blade, wherein the resilient member includes a posture-correcting portion provided with a twisting feature to correct a tip end and a base end of the lip portion in a longitudinal direction to posture directions opposed to each other in accord with the returning of the resilient member to its natural state.

21. The wiper blade according to claim 20, wherein the at least one resilient member is one elongated unitary plate spring.

22. The wiper blade according to claim 20, wherein the at least one resilient member is a pair of parallel elongated plate springs.

* * * * *